United States Patent
Ueda et al.

(10) Patent No.: US 10,964,444 B2
(45) Date of Patent: *Mar. 30, 2021

(54) THERMOPLASTIC RESIN COMPOSITION, AND MOLDED ARTICLE THEREOF

(71) Applicant: DAIKIN INDUSTRIES, LTD., Osaka (JP)

(72) Inventors: Yuki Ueda, Settsu (JP); Masami Nishiumi, Settsu (JP); Haruhisa Masuda, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 84 days.

This patent is subject to a terminal disclaimer.

(21) Appl. No.: 14/906,939

(22) PCT Filed: Jul. 24, 2014

(86) PCT No.: PCT/JP2014/069542
§ 371 (c)(1),
(2) Date: Jan. 22, 2016

(87) PCT Pub. No.: WO2015/012346
PCT Pub. Date: Jan. 29, 2015

(65) Prior Publication Data
US 2016/0163413 A1     Jun. 9, 2016

(30) Foreign Application Priority Data
Jul. 25, 2013   (JP) .............. JP2013-154765

(51) Int. Cl.
| | |
|---|---|
| C08L 27/18 | (2006.01) |
| H01B 3/30 | (2006.01) |
| H01B 3/44 | (2006.01) |
| H01B 3/42 | (2006.01) |
| C09D 127/18 | (2006.01) |
| C09D 171/00 | (2006.01) |
| C08L 71/00 | (2006.01) |

(52) U.S. Cl.
CPC .............. *H01B 3/30* (2013.01); *C08L 27/18* (2013.01); *C08L 71/00* (2013.01); *C09D 127/18* (2013.01); *C09D 171/00* (2013.01); *H01B 3/307* (2013.01); *H01B 3/427* (2013.01); *H01B 3/442* (2013.01); *H01B 3/445* (2013.01); *C08G 2650/40* (2013.01); *C08L 2203/202* (2013.01)

(58) Field of Classification Search
CPC .......... C08L 27/18; C08L 71/12; C08L 71/00; C08L 2203/202; C08L 71/10; C09D 127/18; C09D 171/00; H01B 3/30; H01B 3/307; H01B 3/427; H01B 3/442; H01B 3/445; H01B 3/42; H01B 3/44; C08G 2650/40
See application file for complete search history.

(56) References Cited

U.S. PATENT DOCUMENTS

| | | | | |
|---|---|---|---|---|
| 5,789,508 A | * | 8/1998 | Baker | ............ C08F 14/26 526/225 |
| 6,177,518 B1 | | 1/2001 | Lahijani | |
| 2013/0109810 A1 | * | 5/2013 | Xie | ............ C08L 27/18 525/153 |
| 2014/0329087 A1 | | 11/2014 | Masuda et al. | |
| 2014/0329968 A1 | | 11/2014 | Masuda et al. | |
| 2015/0203679 A1 | | 7/2015 | Ueda et al. | |

FOREIGN PATENT DOCUMENTS

| | | |
|---|---|---|
| JP | 5-225832 A | 9/1993 |
| JP | 8-17258 A | 1/1996 |
| JP | 11-158340 A | 6/1999 |
| JP | 2006-274073 A | 10/2006 |
| JP | 2010-67521 A | 3/2010 |
| JP | 2010-123389 A | 6/2010 |
| JP | 2011-159578 A | 8/2011 |
| JP | 2011-165485 A | 8/2011 |
| WO | 2013/088964 A1 | 6/2013 |
| WO | 2013/088965 A1 | 6/2013 |

(Continued)

OTHER PUBLICATIONS

Engineering Toolbox, Absolute, Dynamic and Kinematic Viscosit, pp. 1-8, http://www.engineeringtoolbox.com/dynamic-absolute-kinematic-viscosity-d_412.html.*
Communication dated Feb. 17, 2017 issued from the European Patent Office in counterpart European Application No. 14830331.6.
International Search Report for PCT/JP2014/069542 dated Oct. 28, 2014.
International Preliminary Report on Patentability issued from the International Bureau in counterpart International application No. PCT/JP2014/069542 dated Jan. 26, 2016.

*Primary Examiner* — Holly Rickman
*Assistant Examiner* — Linda N Chau
(74) *Attorney, Agent, or Firm* — Sughrue Mion, PLLC

(57) ABSTRACT

The present invention aims to provide a resin composition which can provide a molded article excellent in insulation and showing a low relative permittivity and which causes no melt fracture even when extrusion-molded at a high shear rate. The resin composition of the present invention includes an aromatic polyether ketone resin (I) and a fluororesin (II). The fluororesin (II) is a copolymer of tetrafluoroethylene and a perfluoro ethylenically unsaturated compound represented by the following formula (1):

$$CF_2=CF-Rf^1 \quad (1)$$

wherein $Rf^1$ represents $-CF_3$ or $-ORf^2$; and $Rf^2$ represents a C1-C5 perfluoroalkyl group. The aromatic polyether ketone resin (I) and the fluororesin (II) satisfy a melt viscosity ratio (I)/(II) of not lower than 0.001 but lower than 0.3.

7 Claims, No Drawings

(56) References Cited

FOREIGN PATENT DOCUMENTS

| WO | 2013/088966 A1 | 6/2013 |
| WO | 2013/088967 A1 | 6/2013 |
| WO | 2013/088968 A1 | 6/2013 |
| WO | 2014/024671 A1 | 2/2014 |

* cited by examiner

THERMOPLASTIC RESIN COMPOSITION, AND MOLDED ARTICLE THEREOF

CROSS REFERENCE TO RELATED APPLICATIONS

This application is a National Stage of International Application No. PCT/JP2014/069542 filed Jul. 24, 2014, claiming priority based on Japanese Patent Application No. 2013-154765 filed Jul. 25, 2013, the contents of all of which are incorporated herein by reference in their entirety.

TECHNICAL FIELD

The present invention relates to a thermoplastic resin composition and a molded article thereof.

BACKGROUND ART

Electric wires used in automobiles and robots and windings for coils used in motors need to have excellent insulation properties, and a conductor and an insulation layer covering the conductor therein need to be firmly bonded to each other. Further, trends for high-voltage and high-current applications have recently been promoted, which leads to demands for electric wires and coils having insulation layers with low relative permittivity for the purpose of preventing deterioration of the insulation layers due to partial discharge. In addition, windings for motor coils mounted on automobiles need to have high heat resistance.

In view of such situations, various studies have been performed so as to improve the characteristics of electric wires. For example, electric wires having an insulation layer formed from two or more resins are proposed as mentioned below.

For example, Patent Literature 1 proposes an insulated wire that has a thin insulation coating layer having a thickness of not greater than 0.2 mm formed from a resin mixture of 90 to 50% by weight of a polyether ether ketone resin and 10 to 50% by weight of a polyether imide resin.

Patent Literature 2 proposes a resin-coated electric wire or cable having a conductor, a coating layer formed by extrusion molding a polyether ether ketone resin on the conductor, and a fluororesin layer formed between the conductor and the polyether ether ketone resin coating layer.

Patent Literature 3 proposes an insulated wire having an insulation layer formed by applying a resin mixture and baking the mixture, wherein the resin mixture includes at least one resin selected from the group consisting of polyamide imide resin, polyimide resin, polyester imide resin, and class-H polyester resin, and at least one resin selected from the group consisting of fluororesin and polysulfone resin.

Patent Literature 4 proposes an insulated wire having: a first coating layer which is formed directly on a conductor from a resin composition formed by graft-polymerizing a graftable compound to an ethylene/tetrafluoroethylene copolymer; and a second coating layer formed directly on the first coating layer from a resin composition which is a polymer alloy of polyphenylene sulfide resin and polyamide resin.

Patent Literature 5 proposes an insulated wire having an insulation layer consisting of a polymer alloy of polyether sulfone resin and at least one crystalline resin selected from the group consisting of polyphenylene sulfide resin and polyether ether ketone resin, wherein the weight ratio between the polyether sulfone resin and the crystalline resin is 50:50 to 90:10.

Patent Literature 6 proposes an insulated wire having a resin layer formed by applying and baking a resin which is a mixture of polyamide imide or polyester imide and polyphenylene ether at a ratio (by mass) of 60:40 to 95:5.

Patent Literature 7 discloses a resin composition containing polyaryl ketone resin and fluororesin as a resin composition for forming molded articles such as films and sheets.

CITATION LIST

Patent Literature

Patent Literature 1: JP H05-225832 A
Patent Literature 2: JP H08-17258 A
Patent Literature 3: JP 2010-67521 A
Patent Literature 4: JP 2011-165485 A
Patent Literature 5: JP 2010-123389 A
Patent Literature 6: JP 2011-159578 A
Patent Literature 7: JP 2006-274073 A

SUMMARY OF INVENTION

Technical Problem

Still, demands for smaller and higher power devices and motors used in automobiles and robots tend to cause a higher density of current passing through electric wires and coils used in such devices and motors, and to cause higher density of windings. This leads to a demand for electric wires achieving better performance which has never been achieved by conventional electric wires.

Thus, the present inventors have focused on a resin composition containing an aromatic polyether ketone resin and a fluororesin because such a resin composition can provide a molded article excellent in insulation and showing a low relative permittivity. However, they have found a problem of occurrence of melt fracture when the resin composition is extrusion-molded at a high shear rate.

Thus, the present invention aims to provide a resin composition which can provide a molded article excellent in insulation and showing a low relative permittivity and which causes no melt fracture even when extrusion-molded at a high shear rate.

Solution to Problem

The present inventors have performed studies on a way of suppressing melt fracture, and have thereby found that no melt fracture occurs even by extrusion molding at a high shear rate only when the melt viscosity ratio between aromatic polyether ketone resin and fluororesin is within a specific range. Finally, the present inventors have completed the present invention.

Specifically, the present invention relates to a resin composition comprising: an aromatic polyether ketone resin (I); and a fluororesin (II), the fluororesin (II) being a copolymer of tetrafluoroethylene and a perfluoro ethylenically unsaturated compound represented by the following formula (1):

$$CF_2=CF-Rf^1 \qquad (1)$$

(wherein $Rf^1$ represents $-CF_3$ or $-ORf^2$, where $Rf^2$ represents a C1-C5 perfluoroalkyl group), the aromatic polyether ketone resin (I) and the fluororesin (II) satisfying a melt viscosity ratio (I)/(II) of not lower than 0.001 but lower than 0.3.

In the resin composition of the present invention, preferably, the fluororesin (II) is dispersed in the form of particles in the aromatic polyether ketone resin (I), and the fluororesin (II) has an average dispersed particle size of 3.0 µm or smaller.

In the resin composition of the present invention, preferably, the fluororesin (II) is dispersed in the form of particles in the aromatic polyether ketone resin (I), and the fluororesin (II) has a maximum dispersed particle size of 20.0 µm or smaller.

The aromatic polyether ketone resin (I) and the fluororesin (II) preferably satisfy a mass ratio (I):(II) of 95:5 to 40:60.

The fluororesin (II) preferably has a melt flow rate of 0.1 to 100 g/10 min.

The aromatic polyether ketone resin (I) is preferably a polyether ether ketone.

The present invention also relates to a molded article formed from the above resin composition.

The present invention also relates to an insulated wire comprising a conductor (A); and an insulation layer (B) formed around the conductor (A), the insulation layer (B) being formed from the above resin composition.

Advantageous Effects of Invention

Since the resin composition of the present invention has any of the aforementioned characteristics, it can provide a molded article excellent in insulation and showing a low relative permittivity, and causes no melt fracture even when extrusion-molded at a high shear rate.

DESCRIPTION OF EMBODIMENTS

The resin composition of the present invention comprises an aromatic polyether ketone resin (I) and a fluororesin (II). Since the resin composition of the present invention comprises the aromatic polyether ketone resin (I) and the fluororesin (II), it can provide a molded article excellent in insulation and showing a low relative permittivity.

In the resin composition of the present invention, the aromatic polyether ketone resin (I) and the fluororesin (II) satisfy a melt viscosity ratio (I)/(II) of not lower than 0.001 but lower than 0.3. With a melt viscosity ratio within the above range, surprisingly, no melt fracture occurs even when the resin composition is extrusion-molded at a high shear rate. The melt viscosity ratio (I)/(II) is more preferably 0.03 to 0.20, still more preferably 0.05 to 0.15.

The aromatic polyether ketone resin (I) is preferably at least one resin selected from the group consisting of polyether ketone, polyether ether ketone, polyether ketone ketone, and polyether ketone ether ketone ketone; more preferably at least one resin selected from the group consisting of polyether ketone and polyether ether ketone; still more preferably polyether ether ketone.

The aromatic polyether ketone resin (I) preferably has a melt viscosity of 0.15 to 1.50 kNsm$^{-2}$ at 60 sec$^{-1}$ and 390° C. With a melt viscosity within the above range, the mold-processability of the resin composition of the present invention can be improved. The lower limit of the melt viscosity is more preferably 0.20 kNsm$^{-2}$. The upper limit of the melt viscosity is more preferably 1.0 kNsm$^{-2}$.

The melt viscosity of the aromatic polyether ketone resin (I) is determined in conformity with ASTM D3835.

The aromatic polyether ketone resin (I) preferably has a glass transition temperature of 130° C. or higher. The glass transition temperature is more preferably 135° C. or higher, still more preferably 140° C. or higher. With a glass transition temperature within the above range, the resulting molded article can be excellent in heat resistance. The glass transition temperature is measured using a device for differential scanning calorimetry (DSC).

The aromatic polyether ketone resin (I) preferably has a melting point of 300° C. or higher. The melting point is more preferably 320° C. or higher. With a melting point within the above range, the resulting molded article can be excellent in heat resistance. The melting point is measured using a device for differential scanning calorimetry (DSC).

The fluororesin (II) is a copolymer of tetrafluoroethylene (TFE) and a perfluoro ethylenically unsaturated compound represented by the following formula (1):

$$CF_2=CF-Rf^1 \qquad (1)$$

wherein $Rf^1$ represents $-CF_3$ or $-ORf^2$, where $Rf^2$ represents a C1-C5 perfluoroalkyl group. Such a fluororesin (II) is efficiently dispersed in the aromatic polyether ketone resin (I), so that the resulting molded article shows better mechanical properties, as well as excellent insulation and a low relative permittivity. Further, when an insulation layer is formed around a conductor using the resin composition of the present invention, the insulation layer and the conductor are more firmly bonded to each other. For example, use of polytetrafluoroethylene causes the resulting molded article to have insufficient mechanical properties and low bonding strength with a conductor.

The fluororesin (II) may comprise one fluororesin or a combination of two or more fluororesins.

When $Rf^1$ is $-ORf^2$, $Rf^2$ is preferably a C1-C3 perfluoroalkyl group.

The perfluoro ethylenically unsaturated compound represented by the formula (1) is preferably at least one selected from the group consisting of hexafluoropropylene and perfluoro(alkyl vinyl ethers), more preferably at least one selected from the group consisting of hexafluoropropylene, perfluoro(methyl vinyl ether), perfluoro(ethyl vinyl ether), and perfluoro(propyl vinyl ether), still more preferably at least one selected from the group consisting of hexafluoropropylene and perfluoro(propyl vinyl ether).

The fluororesin (II) preferably comprises 80 to 99.5 mol % of TFE and 0.5 to 20 mol % of a perfluoro ethylenically unsaturated compound represented by the formula (1). The lower limit of the amount of the TFE constituting the fluororesin (II) is more preferably 85 mol %, still more preferably 87 mol %, particularly preferably 90 mol %, more particularly preferably 93 mol %. The upper limit of the amount of the TFE constituting the fluororesin (II) is more preferably 99 mol %, still more preferably 97 mol %, particularly preferably 95 mol %.

The lower limit of the amount of the perfluoro ethylenically unsaturated compound represented by the formula (1) constituting the fluororesin (II) is more preferably 1 mol %, much more preferably 1.5 mol %, still more preferably 3 mol %, particularly preferably 4 mol %, most preferably 5 mol %. The upper limit of the amount of the perfluoro ethylenically unsaturated compound represented by the formula (1) constituting the fluororesin (II) is more preferably 15 mol %, still more preferably 13 mol %, particularly preferably 10 mol %, more particularly preferably 7 mol %.

The fluororesin (II) is preferably a perfluoropolymer in order to provide a molded article having better mechanical strength and wear resistance. The fluororesin (II) is more preferably at least one selected from the group consisting of tetrafluoroethylene/perfluoro(alkyl vinyl ether) copolymers, tetrafluoroethylene/hexafluoropropylene copolymers, and tetrafluoroethylene/hexafluoropropylene/perfluoro(alkyl vinyl ether) copolymers. The fluororesin (II) is particularly preferably at least one selected from the group consisting of tetrafluoroethylene/hexafluoropropylene copolymers and tetrafluoroethylene/hexafluoropropylene/perfluoro(alkyl vinyl ether) copolymers.

The fluororesin (II) preferably has a melt flow rate (MFR) of 0.1 to 100 g/10 min, more preferably 1 to 40 g/10 min, at 372° C. and a load of 5000 g. With an MFR within the above range, the molding processability of the resin composition can be improved. Further, when an insulation layer is formed around a conductor using the resin composition of the present invention, the insulation layer and the conductor are more firmly bonded to each other. The lower limit of the MFR is still more preferably 2 g/10 min, particularly preferably 3 g/10 min. In order to firmly bond the insulation layer and the conductor, the upper limit of the MFR is still more preferably 38 g/10 min, particularly preferably 35 g/10 min.

The MFR of the fluororesin (II) is determined using a melt indexer in conformity with ASTM D3307-01.

The fluororesin (II) may have any melting point, and preferably has a melting point equal to or lower than the melting point of the aromatic polyether ketone resin (I) because the fluororesin (II) is preferably molten at a temperature where the aromatic polyether ketone resin (I) used in molding is molten. For example, the melting point of the fluororesin (II) is preferably 230° C. to 350° C. The melting point of the fluororesin (II) is determined as a temperature corresponding to the maximum value on the heat-of-fusion curve at a temperature-increasing rate of 10° C./min using a device for differential scanning calorimetry (DSC).

The fluororesin (II) preferably has a melt viscosity of 0.5 to 4.0 kNsm$^{-2}$ at 60 sec$^{-1}$ and 390° C. With a melt viscosity within this range, the molding processability of the resin composition can be improved. The lower limit of the melt viscosity is more preferably 1.0 kNsm$^{-2}$. The upper limit of the melt viscosity is more preferably 3.0 kNsm$^{-2}$.

The melt viscosity of the fluororesin (II) is measured in conformity with ASTM D3835.

The fluororesin (II) may be preliminarily treated with fluorine gas or ammonia by a known method.

In the resin composition of the present invention, the aromatic polyether ketone resin (I) and the fluororesin (II) preferably satisfy a mass ratio (I):(II) of 99:1 to 30:70, more preferably 95:5 to 40:60, still more preferably 95:5 to 50:50, for good electrical characteristics. With a mass ratio (I):(II) within the above range, the resulting molded article can have excellent insulation and heat resistance and show a low relative permittivity. Further, when an insulation layer is formed around a conductor using the resin composition of the present invention, the insulation layer and the conductor are firmly bonded to each other. If the proportion of the fluororesin (II) in the mass ratio between the aromatic polyether ketone resin (I) and the fluororesin (II) exceeds 60, the bond strength between the insulation layer and the conductor and the heat resistance tend to be poor. If the proportion is lower than 5, the relative permittivity may be disadvantageously high. In order to reduce the dispersed particle size and to improve the mechanical properties, the mass ratio is more preferably 90:10 to 45:55, particularly preferably 70:30 to 45:55. The proportion of the aromatic polyether ketone resin (I) in the mass ratio between the aromatic polyether ketone resin (I) and the fluororesin (II) may be 70 or higher.

On the basis of the findings of the present inventors, the more the amount of the fluororesin is, the more easily the melt fracture occurs. Still, the resin composition of the present invention satisfies a melt viscosity ratio within the above range, and thus causes no melt fracture even when it contains a large amount of fluororesin and is extrusion-molded at a high shear rate.

In the resin composition of the present invention, the fluororesin (II) is dispersed in the form of particles in the aromatic polyether ketone resin (I), and preferably has an average dispersed particle size of not larger than 3.0 µm. The average dispersed particle size is also more preferably 2.0 µm or smaller, still more preferably 1.5 µm or smaller, particularly preferably smaller than 1.5 µm.

The fluororesin (II) dispersed in the aromatic polyether ketone resin (I) with an average dispersed particle size within the above range leads to marked improvement of the mechanical properties of the resulting molded article. When an insulation layer is formed around a conductor using the resin composition of the present invention, the bond strength between the conductor and the insulation layer is markedly improved. Too large an average dispersed particle size may lead to deterioration in mechanical properties, as well as deterioration in bond strength with the conductor. The average dispersed particle size may have any lower limit, and the lower limit may be 0.1 µm.

The maximum dispersed particle size of the fluororesin (II) is preferably 20.0 µm or smaller, more preferably 10.0 µm or smaller. The fluororesin (II) having a maximum dispersed particle size within the above range allows the resulting resin composition to be excellent in molding processability, providing a molded article having excellent mechanical properties. When an insulation layer is formed around a conductor using the resin composition of the present invention, the bond strength between the conductor and the insulation layer is markedly improved.

The average dispersed particle size and the maximum dispersed particle size of the fluororesin (II) can be measured by microscopically observing the cross section of a slice cut out of a strand of the resin composition of the present invention using a confocal laser scanning microscope or a transmission electron microscope (TEM), and then binarizing the obtained image using an optical analysis device.

The resin composition of the present invention contains the aromatic polyether ketone resin (I) and the fluororesin (II), and may optionally further contain an additional component(s). Any additional component may be used, and examples thereof include fibrous reinforcing agents such as whiskers (e.g. potassium titanate whiskers), glass fibers, asbestos fibers, carbon fibers, ceramic fibers, potassium titanate fibers, aramid fibers, and other high-strength fibers; inorganic filler such as calcium carbonate, talc, mica, clay, carbon powder, graphite, and glass beads; colorants; usually used inorganic or organic filler such as flame retardants; stabilizers such as minerals and flakes; lubricants such as silicone oil and molybdenum disulfide; pigments; conducting agents such as carbon black; impact resistance improvers such as rubber; and other additives.

The resin composition of the present invention may be produced by mixing the aromatic polyether ketone resin (I) and the fluororesin (II) using a mixer typically used for mixing resin compositions, such as compositions for molding. Examples of the mixer include mixing mills, Banbury mixers, pressure kneaders, and extruders. The mixer is preferably a twin-screw extruder, particularly preferably a twin-screw extruder having a large L/D screw structure, because such a mixer can reduce the average dispersed particle size of the fluororesin (II). The screw structure of a twin-screw extruder more preferably satisfies L/D=35 or higher, still more preferably L/D=40 or higher, particularly preferably L/D=45 or higher. The ratio L/D means effective screw length (L)/screw diameter (D).

The resin composition of the present invention may be produced by mixing the aromatic polyether ketone resin (I) and the fluororesin (II) each in a molten state.

Sufficient kneading of the aromatic polyether ketone resin (I) and the fluororesin (II) provides a resin composition having a desired dispersion state. The dispersion state of the fluororesin (II) affects the insulation of the resulting molded article and, when the molded article is used as an insulation layer of an insulated wire, the adhesion between the core and the insulation layer. Thus, in order to achieve a desired dispersion state in the molded article, the mixing method needs to be appropriately selected.

The resin composition of the present invention may be preferably produced by, for example, a method in which the aromatic polyether ketone resin (I) and the fluororesin (II) are charged into a mixer at an appropriate ratio, the aforementioned additional component(s) is/are optionally added thereto, and then the components are melt-kneaded at the melting points of the resins (I) and (II) or higher.

The additional component(s) may be added to and mixed with the aromatic polyether ketone resin (I) and the fluororesin (II) before the kneading of the resins (I) and (II), or may be mixed with the aromatic polyether ketone resin (I) and the fluororesin (II) when these resins are blended.

The melt-kneading temperature may be appropriately set in accordance with, for example, the types of the aromatic polyether ketone resin (I) and the fluororesin (II) to be used. For example, the temperature is preferably 360° C. to 400° C. The kneading time is usually one minute to one hour.

A molded article formed from the resin composition of the present invention is also one aspect of the present invention.

In the electrical, electronic, and semiconductor fields, the molded article formed from the resin composition of the present invention may be used for components (e.g. CMP retainer rings, etching rings, silicon wafer carriers, and IC chip trays) of semiconductor- and liquid crystal device-manufacturing devices, insulating films, small button cells, cable connectors, and casings of aluminum electrolytic capacitors. In the automobile field, the molded article may be used for thrust washers, oil filters, gears for auto air-conditioner controlling units, gears for throttle bodies, coatings for electric wires of motor coils, ABS parts, AT seal rings, MT shift fork pads, bearings, seals, and clutch rings. In the industrial field, the molded article may be used for compressor components, cables for mass transport systems, conveyor belt chains, connectors for oil field development machinery, pump components for hydraulic pressure driver systems (e.g. bearings, port plates, ball joints of pistons), gears, and seal rings for pistons. In the aerospace field, the molded article may be used for cabin interior components and fuel pipe protecting materials in aircraft. The molded article may also be used for other products such as food and beverage production equipment components, and medical instruments (e.g. sterile instruments, gas and liquid chromatographs).

The molded article may have any of various shapes, such as a sheet shape, a film shape, a rod shape, and a pipe shape.

It is also suitable to produce a molded article for sliding parts from the resin composition of the present invention. A molded article for sliding parts which is formed from the resin composition of the present invention has a low coefficient of kinetic friction, and thus is suitable for use as a sliding part. Since the molded article contains the fluororesin (II), the molded article is also excellent in properties such as chemical resistance, weather resistance, non-adhesiveness, water repellence, and electrical characteristics.

Examples of the molded article for sliding parts include, but not particularly limited to, sealants, gears, actuators, pistons, bearings, bearing retainers, bushings, switches, belts, bearings, cams, rollers, and sockets.

The bearings are elements placed around a shaft and used in contact with the shaft, and examples thereof include shaft washers of antifriction bearings and plain bearings. They usually support a rotationally or linearly moving shaft and keep the motion and the working load. These bearings may be used alone, or may be used in combination with any other elements. When used in combination with any other elements, examples thereof include antifriction bearings such as ball bearings, roller bearings, radial bearings, and thrust bearings; plain bearings such as circular bearings, partial bearings, and non-circular bearings; self-lubricating bearings; foil bearings; and magnetic bearings.

The gears are elements usually attached to a rotationally moving shaft and used for power transmission. Examples thereof include spur gears, helical gears, racks, internal gears, bevel gears, miter gears, screw gears, worm gears, driving gears, and idle gears.

The seal rings are usually attached to a rotationally moving shaft or a shaft moving in the axial direction. Examples thereof include those sealing oil between a transmission or a cylinder of a piston and the shaft. Such seal rings can be used for various applications, such as seal rings for pistons for automatic transmissions of automobiles and engines of automobiles, ships, construction vehicles, and industrial machinery.

Any conditions may be applicable to a molding device used in the method of producing a molded article, and the molding may be performed in usual conditions, for example. The molding temperature is usually preferred to be equal to or higher than the melting point of the aromatic polyether ketone resin (I) to be used. Also, the molding temperature is preferably below the lower of the decomposition temperature of the fluororesin (II) and the decomposition temperature of the aromatic polyether ketone resin (I). The molding temperature may be, for example, 250° C. to 400° C.

The molded article of the present invention may be formed by a molding method commonly used for thermoplastic resin compositions, such as injection molding, extrusion molding, press molding, blow molding, calender molding, and casting, in accordance with the type, use, and shape of a molded article to be obtained. The molded article may also be produced by a molding method which is a combination of the above molding methods. The molded article may be obtained through composite molding of the resin composition of the present invention and other polymer(s).

The molded article formed from the resin composition of the present invention is particularly excellent in flexibility and electrical characteristics. Thus, when it is used for an insulation layer of an insulated wire, the insulation layer has excellent insulation, as well as shows a low relative permittivity. Further, the resulting electric wire is excellent in handleability. In addition, such an insulation layer is also excellent in heat resistance, mechanical strength, tensile elongation, and crack resistance. Even when the insulated wire is used at high temperature, the insulation layer is not peeled off the conductor. Accordingly, the molded article formed from the resin composition of the present invention can be suitably used as an insulation layer of an insulated wire.

In other words, an insulated wire comprising a conductor (A) and an insulation layer (B) formed around the conductor (A), the insulation layer (B) being formed from the resin composition of the present invention, is also one aspect of the present invention.

The insulated wire of the present invention can also be suitably used for a thin line in which the insulation layer (B) has a small thickness.

In the insulated wire of the present invention, the insulation layer (B) formed around the conductor (A) may be in contact with the conductor (A), or another layer such as a resin layer may be formed between the insulation layer (B) and the conductor (A). The insulation layer (B) is preferably in contact with the conductor (A). In this case, the conductor (A) and the insulation layer (B) are firmly bonded to each other.

The insulation layer (B) may have any thickness, and is preferably 1 to 250 μm in thick. The thickness is more preferably 50 to 200 μm, still more preferably 70 to 150 μm. The insulation layer (B) may be made as thin as 80 μm or smaller. For excellent heat radiation, it is advantageous to make the insulation layer (B) thin.

The insulation layer (B) may be obtained by applying the resin composition of the present invention around the conductor (A). For example, the insulated wire of the present invention may be produced by a production method including: producing the resin composition of the present invention; and melt-extruding the resin composition of the present invention into the insulation layer (B) around the conductor (A). The resin composition of the present invention causes no melt fracture even when extrusion-molded at a high shear rate. Thus, the method of molding the resin composition of the present invention shows very high productivity.

Use of the resin composition of the present invention leads to a bond strength between the insulation layer (B) and the conductor (A) of 10 N/cm or higher. A bond strength within the above range is particularly suitable for uses such as electric wires for automobiles and windings for motor coils. The bond strength is more preferably 15 N/cm or higher, still more preferably 20 N/cm or higher.

The insulation layer (B) may be formed by any method, and the formation conditions may be conventionally known ones. The insulation layer (B) may be formed directly on the conductor (A), or another layer such as a resin layer may be disposed therebetween.

The insulation layer (B) may be formed by, for example, a method in which the resin composition is melt-extruded onto the surface of the conductor (A) or the surface of a resin layer preliminarily formed on the conductor (A), or a method in which the resin composition is melt-extruded to form a film in advance, the film is slit into a predetermined size, and the resulting film is wound around the surface of the conductor (A) or the surface of a resin layer preliminarily formed on the conductor (A).

In the case of forming the insulation layer (B) by melt-extrusion, the temperature is usually preferred to be equal to or higher than the melting point of the aromatic polyether ketone resin (I) to be used. Also, the molding temperature is preferably below the lower of the decomposition temperature of the fluororesin (II) and the decomposition temperature of the aromatic polyether ketone resin (I). The molding temperature may be, for example, 250° C. to 400° C. The molding temperature is preferably 320° C. to 400° C.

The insulated wire of the present invention may be heated after the insulation layer (B) is formed. The heating may be performed at a temperature around the melting point of the fluororesin (II).

The insulated wire of the present invention comprises the insulation layer (B) formed around the conductor (A). Another layer such as a resin layer may be formed between the conductor (A) and the insulation layer (B). Further, the insulated wire of the present invention may have another layer such as a resin layer around the insulation layer (B).

The resin layer is different from the insulation layer (B). The resin layer is preferably a layer of at least one resin selected from the group consisting of aromatic polyether ketone resin, fluororesin, polyamide imide, polyether imide, polyether sulfone, and polyphenylene sulfide.

The material of the conductor (A) may be any highly conductive material, and examples thereof include copper, copper alloy, copper-clad aluminum, aluminum, silver, gold, and zinc-plated iron.

The conductor (A) may have any shape such as a circular shape or a planar shape. In the case of a circular conductor, the conductor (A) may have a diameter of 0.3 to 2.5 mm.

The insulated wire of the present invention may be suitably used for a wrapped electric wire, an electric wire for automobiles, an electric wire for robots, and the like. It may also be suitably used as a winding for coils (magnet wires), and the electric wire of the present invention is less likely to cause damages in winding processes. The winding is suitable for motors, rotary electric machinery, compressors, voltage converters (transformers), and the like. Thus, the winding has characteristics sufficiently tolerant to uses in small, high-power motors which require high voltage, high current, and high heat conductivity, as well as a high-density winding process. The winding is also suitable as an electric wire for power distribution, power transmission, or communication.

EXAMPLES

The present invention is described referring to, but not limited to, the following examples.

<Measurement of MFR>

The mass (g/10 min) of the polymer flowing out of a nozzle (inner diameter: 2 mm, length: 8 mm) per 10 minutes at 372° C. under a load of 5000 g was determined using a melt indexer (Toyo Seiki Seisaku-sho, Ltd.) in conformity with ASTM D3307-01.

<Measurement of Melt Viscosity>

The melt viscosity of the aromatic polyether ketone resin was measured at 60 $sec^{-1}$ and 390° C. in conformity with ASTM D3835.

The melt viscosity of the fluororesin was measured at 60 $sec^{-1}$ and 390° C. in conformity with ASTM D3835.

The melt viscosity of the resin composition was measured at 60 $sec^{-1}$ and 390° C. in conformity with ASTM D3835.

<Calculation of Average Dispersed Particle Size and Maximum Dispersed Particle Size>

A strand of the resin composition obtained by melt-kneading was fixed on a sample holder of a microtome (Micro-edge Instruments Co., Ltd.), and a slice having a thickness of about 30 μm was cut out.

The cross section of the resulting slice was observed using a laser microscope (Keyence Corp.). The resulting electronic image was binarized using image analysis software (Win-ROOF v.6.3, MITANI CORP.), and thereby the average dispersed particle size and the maximum dispersed particle size of the dispersed phase were determined.

<Production of Film>

Pellets of the resin composition were fed into a T-die extruder for film molding (Labo Plastomill T-die extrusion-molding device, Toyo Seiki Seisaku-sho, Ltd., φ20 mm, L/D=25, die width: 150 mm, lip width: 0.4 mm), and molded into a film having a thickness of 100 μm at a cylinder temperature of 325° C. to 345°, a die temperature of 330° C., and a screw rotation speed of 40 to 60 rpm.

<Measurement of Relative Permittivity>

A rectangular piece having a size of 2 mm in width and 100 mm in length was cut out of the film (thickness: 100 μm) formed by the above method. Then, the relative permittivity thereof at 1 MHz was measured by a cavity resonator perturbation technique (using a permittivity measurement device (Kanto Electronic Application and Development Inc.) and a network analyzer (Agilent Technologies, Inc.)).

The following materials were used in the examples and comparative examples.

Aromatic polyether ketone resin (1): polyether ether ketone (melt viscosity: 1.19 kNsm$^{-2}$)
Aromatic polyether ketone resin (2): polyether ether ketone (melt viscosity: 0.31 kNsm$^{-2}$)
Aromatic polyether ketone resin (3): polyether ether ketone (melt viscosity: 0.20 kNsm$^{-2}$)
Fluororesin (1): tetrafluoroethylene/hexafluoropropylene copolymer (compositional weight ratio: tetrafluoroethylene/hexafluoropropylene/perfluoro(propyl vinyl ether)=87.5/11.5/1.0, MFR: 23 g/10 min, melt viscosity: 0.55 kNsm$^{-2}$)
Fluororesin (2): tetrafluoroethylene/hexafluoropropylene copolymer (compositional weight ratio: tetrafluoroethylene/hexafluoropropylene/perfluoro(propyl vinyl ether)=87.5/11.5/1.0, MFR: 6.0 g/10 min, melt viscosity: 2.23 kNsm$^{-2}$)

Example 1

The aromatic polyether ketone resin (2) and the fluororesin (2) were pre-mixed at the ratio (parts by mass) shown in Table 1 and melt-kneaded using a twin-screw extruder (φ15 mm, L/D=60) at a cylinder temperature of 390° C. and a screw rotation speed of 300 rpm, thereby producing pellets (and a strand) of a resin composition in which the fluororesin (2) was dispersed in the aromatic polyether ketone resin (2).

The resulting pellets of the resin composition were extrusion-molded onto a conductor at a die temperature of 385° C. and at shear rates of 60 sec$^{-1}$, 150 sec$^{-1}$, and 600 sec$^{-1}$. Thereby, an insulation coating having a thickness of 100 μm was formed on the conductor. Then, the occurrence of melt fracture was checked. Table 1 shows the results.

Examples 2 to 5

The aromatic polyether ketone resin (3) and the fluororesin (2) were pre-mixed at the ratio (parts by mass) shown in Table 1 and melt-kneaded using a twin-screw extruder (φ15 mm, L/D=60) at a cylinder temperature of 390° C. and a screw rotation speed of 300 rpm, thereby producing pellets (and a strand) of a resin composition in which the fluororesin (2) was dispersed in the aromatic polyether ketone resin (3).

Next, an insulated wire was produced in the same manner as in Example 1 except for using the pellets of the resin composition obtained above.

Thereafter, the evaluations were performed by the above methods. Table 1 shows the results.

Comparative Examples 1 and 2

The aromatic polyether ketone resin (1) and the fluororesin (1) were pre-mixed at the ratio (parts by mass) shown in Table 1 and melt-kneaded using a twin-screw extruder (φ15 mm, L/D=60) at a cylinder temperature of 390° C. and a screw rotation speed of 300 rpm, thereby producing pellets (and strands) of a resin composition in which the fluororesin (1) was dispersed in the aromatic polyether ketone resin (1).

Next, an insulated wire was produced in the same manner as in Example 1 except for using the pellets of the resin composition obtained above.

Thereafter, the evaluations were performed by the above methods. Table 1 shows the results.

Comparative Example 3

The aromatic polyether ketone resin (1) and the fluororesin (2) were pre-mixed at the ratio (parts by mass) shown in Table 1 and melt-kneaded using a twin-screw extruder (φ15 mm, L/D=60) at a cylinder temperature of 390° C. and a screw rotation speed of 300 rpm, thereby producing pellets (and a strand) of a resin composition in which the fluororesin (2) was dispersed in the aromatic polyether ketone resin (1).

Next, an insulated wire was produced in the same manner as in Example 1 except for using the pellets of the resin composition obtained above.

Thereafter, the evaluations were performed by the above methods. Table 1 shows the results.

TABLE 1

| | | Example 1 | Example 2 | Example 3 | Example 4 | Example 5 | Comparative Example 1 | Comparative Example 2 | Comparative Example 3 |
|---|---|---|---|---|---|---|---|---|---|
| Polyether ketone resin (1) | | | | | | | 80 | 60 | 60 |
| Polyether ketone resin (2) | | 80 | | | | | | | |
| Polyether ketone resin (3) | | | 80 | 70 | 60 | 50 | | | |
| Fluororesin (1) | | | | | | | 20 | 40 | |
| Fluororesin (2) | | 20 | 20 | 30 | 40 | 50 | | | 40 |
| Melt viscosity ratio (polyether ketone resin/fluororesin) | | 0.14 | 0.09 | 0.09 | 0.09 | 0.09 | 2.16 | 2.16 | 0.53 |
| Melt viscosity of resin composition (60 sec$^{-1}$) (kNsm$^{-2}$) | | 0.36 | 0.76 | 0.87 | 0.95 | 1.25 | 1.43 | 0.79 | 0.95 |
| Occurrence of melt fracture | Shear rate 60 sec$^{-1}$ | None | None | None | None | None | None | Occurred | Occurred |
| | Shear rate 150 sec$^{-1}$ | None | None | None | None | None | Occurred | Occurred | Occurred |
| | Shear rate 600 sec$^{-1}$ | None | None | None | None | None | Occurred | Occurred | Occurred |
| Average dispersed particle size (μm) | | 0.75 | 1.14 | 1.58 | 1.24 | 1.32 | 0.19 | 0.51 | 0.62 |
| Maximum dispersed particle size (μm) | | 1.19 | 5.29 | 6.13 | 5.78 | 6.20 | 0.44 | 0.93 | 1.28 |
| Relative permittivity 1 MHz | | 2.7 | 2.6 | 2.5 | 2.4 | 2.4 | 2.6 | 2.4 | 2.4 |

The invention claimed is:

1. A resin composition comprising:
an aromatic polyether ketone resin (I); and
a fluororesin (II),
the fluororesin (II) being a copolymer of tetrafluoroethylene and a perfluoro ethylenically unsaturated compound represented by the following formula (1):

$$CF_2=CF-Rf^1 \quad (1)$$

wherein $Rf^1$ represents $-CF_3$ or $-ORf^2$, where $Rf^2$ represents a C1-C5 perfluoroalkyl group,
the aromatic polyether ketone resin (I) has a melt viscosity of 0.20 to 1.19 $kNsm^{-2}$ at 60 $sec^{-1}$ and 390° C.,
wherein the fluororesin (II) has a melt viscosity of 0.55 to 2.23 $kNsm^{-2}$ at 60 $sec^{-1}$ and 390° C.,
the aromatic polyether ketone resin (I) and the fluororesin (II) satisfying a melt viscosity ratio (I)/(II) at 60 $sec^{-1}$ and 390° C. of 0.09 to 0.14, the aromatic polyether ketone resin (I) and the fluororesin (II) satisfying a mass ratio (I):(II) of at most 70:30,
the aromatic polyether ketone resin (I) is a polyether ether ketone,
the fluororesin (II) is at least one selected from the group consisting of tetrafluoroethylene/hexafluoropropylene copolymers and tetrafluoroethylene/hexafluoropropylene/perfluoro(alkyl vinyl ether) copolymers,
the fluororesin (II) comprises 80 to 99.5 mol % of tetrafluoroethylene and 0.5 to 20 mol % of a perfluoro ethylenically unsaturated compound represented by the formula (1).

2. The resin composition according to claim 1, wherein the fluororesin (II) is dispersed in the form of particles in the aromatic polyether ketone resin (I), and the fluororesin (II) has an average dispersed particle size of 3.0 μm or smaller.

3. The resin composition according to claim 1, wherein the fluororesin (II) is dispersed in the form of particles in the aromatic polyether ketone resin (I), and the fluororesin (II) has a maximum dispersed particle size of 20.0 μm or smaller.

4. The resin composition according to claim 1, wherein the aromatic polyether ketone resin (I) and the fluororesin (II) satisfy a mass ratio (I):(II) of 70:30 to 40:60.

5. The resin composition according to claim 1, wherein the fluororesin (II) has a melt flow rate of 0.1 to 100 g/10 min.

6. A molded article formed from the resin composition according to claim 1.

7. An insulated wire comprising:
a conductor (A); and
an insulation layer (B) formed around the conductor (A), the insulation layer (B) being formed from the resin composition according to claim 1.

* * * * *